(12) United States Patent
Han et al.

(10) Patent No.: US 10,291,105 B2
(45) Date of Patent: May 14, 2019

(54) COOLING STRUCTURE OF DRIVE MOTOR

(71) Applicant: Hyundai Motor Company, Seoul (KR)

(72) Inventors: Dongyeon Han, Seoul (KR); Jungwoo Lee, Hwaseong-si (KR); Hyoungjun Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 344 days.

(21) Appl. No.: 15/378,665

(22) Filed: Dec. 14, 2016

(65) Prior Publication Data

US 2018/0102692 A1   Apr. 12, 2018

(30) Foreign Application Priority Data

Oct. 7, 2016  (KR) .......................... 10-2016-0129841

(51) Int. Cl.
| | |
|---|---|
| *H02K 9/19* | (2006.01) |
| *H02K 5/18* | (2006.01) |
| *H02K 15/14* | (2006.01) |
| *H02K 5/20* | (2006.01) |
| *H02K 9/193* | (2006.01) |
| *H02K 9/24* | (2006.01) |

(52) U.S. Cl.
CPC ............... *H02K 9/19* (2013.01); *H02K 5/18* (2013.01); *H02K 5/20* (2013.01); *H02K 15/14* (2013.01); *H02K 9/193* (2013.01); *H02K 9/24* (2013.01)

(58) Field of Classification Search
CPC ............. H02K 9/19; H02K 9/193; H02K 9/24

USPC .................................................. 310/52–54
See application file for complete search history.

(56) References Cited

U.S. PATENT DOCUMENTS

| | | | | |
|---|---|---|---|---|
| 2012/0091835 A1* | 4/2012 | Kim | ........................ | B60K 6/26 310/54 |
| 2013/0334912 A1* | 12/2013 | Tokunaga | ................ | H02K 9/19 310/54 |
| 2013/0342045 A1* | 12/2013 | Matsuki | ................... | H02K 5/20 310/54 |
| 2014/0167535 A1* | 6/2014 | Han | ........................ | H02K 5/20 310/52 |
| 2015/0097451 A1* | 4/2015 | Yang | ....................... | H02K 9/19 310/54 |

FOREIGN PATENT DOCUMENTS

| | | |
|---|---|---|
| JP | 2006060914 A | 3/2006 |
| JP | 2014134270 A | 7/2014 |
| KR | 200360750 Y1 | 9/2004 |
| KR | 20160047809 A | 5/2016 |

* cited by examiner

*Primary Examiner* — Gary A Nash
(74) *Attorney, Agent, or Firm* — Slater Matsil, LLP

(57) ABSTRACT

A cooling apparatus of a drive motor is disclosed. An exemplary embodiment of the cooling apparatus may include a flow passage through which coolant flows. The flow passage is formed in the motor housing. A coolant inflow portion and a coolant outflow portion are connected with the flow passage. At least one penetration hole is formed in the motor housing and connected with the flow passage. A seal member is engaged with the penetration hole to vary a cross-sectional area of the flow passage.

17 Claims, 7 Drawing Sheets

COOLING STRUCTURE OF DRIVE MOTOR

CROSS-REFERENCE TO RELATED APPLICATIONS

This application claims priority to and the benefit of Korean Patent Application No. 10-2016-0129841 filed in the Korean Intellectual Property Office on Oct. 7, 2016, the entire contents of which are incorporated herein by reference.

TECHNICAL FIELD

The present invention relates to a drive motor for an environmentally-friendly vehicle. More particularly, the present invention relates to a cooling structure of a drive motor to cool the drive motor.

BACKGROUND

In general, a hybrid vehicle or an electric vehicle, called an eco-friendly vehicle, may generate driving power with an electric motor (hereinafter called "drive motor"), which obtains torque from electrical energy.

The drive motor includes a stator and a rotor. The stator is disposed in a motor housing, and the rotor is disposed at a predetermined air gap therefrom at the inside of the stator. The stator includes a stator core made of an electric steel plate and a coil wound around the stator core.

A large amount of heat is generated according to a current applied to the coil. Accordingly, in order to prevent damage to the drive motor due to the heat and to continuously ensure stable operability, substantial cooling should be performed.

Particularly, cooling of the drive motor such as a permanent magnet synchronous motor (PMSM) is very important for motor efficiency and protection of key components (for example, permanent magnet, coil, etc.). Cooling of the drive motor is major factor that determines performance and efficiency of the drive motor. In other words, the permanent magnet and the coil of the drive motor affect the performance of the motor according to temperature.

A scheme for cooling the drive motor includes an oil cooling scheme using oil and a water cooling scheme using water. For example, among them, in a cooling unit of a drive motor through the water cooling scheme, a coolant flow path is formed between an outer side of a stator and an inner side of a motor housing, and a coolant flows through the flow path so that heat generated by the stator may be cooled by the coolant.

Therefore, heat generated in the drive motor is transmitted to the motor housing through the stator core, and dissipated outside through the motor housing. Coolant flows in a coolant channel of the motor housing such that heat dissipation is maximized and the drive motor is cooled.

However, according to the conventional water cooling scheme, a cooling surface and heat dissipation of coolant with respect to the motor housing is limited, and it is very difficult to improve cooling performance of the drive motor.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a cooling apparatus of a drive motor that can improve cooling performance of the drive motor by reducing a cross-sectional area of a flow passage of coolant and increasing a velocity of coolant.

A cooling apparatus can be is disposed in a motor housing of a driving motor according to an exemplary embodiment of the present invention. A flow passage through which coolant flows is provided. The flow passage is formed in the motor housing. A coolant inflow portion and a coolant outflow portion are connected with the flow passage. At least one penetration hole is formed in the motor housing and connected with the flow passage. A seal member is engaged with the penetration hole and varies a cross-sectional area of the flow passage.

The motor housing may be manufactured by core-type low pressure casting to have the flow passage formed therein as one unit.

The penetration hole may be formed as a core hole.

The seal member may be engaged with the penetration hole, and may include a seal bolt that varies a cross-sectional area of the flow passage.

The seal bolt may include a head portion supporting an edge portion of the penetration hole, and a bolt portion integrally connected with the head portion and engaged with an interior circumference of the penetration hole.

A part of the bolt portion may protrude to the flow passage through the penetration hole, and reduces the cross-sectional area of the flow passage.

A maximally protruded cross-sectional area of the bolt portion with respect to the flow passage may be 50% of the cross-sectional area of the flow passage.

At least one cooling fin may protrude from a protruded portion where the part of the bolt portion protrudes to the cooling passage.

At least one cooling groove may be formed at an end portion of the bolt portion along an outside circumferential surface thereof.

A gasket groove may be formed at a connection portion where the head portion and the bolt portion are connected.

Sealing gaskets having a semicircular shape may be assembled to the gasket groove at both sides of the connection portion.

A hook-shaped sealing protrusion may be formed at an exterior end portion of the sealing gasket, and the sealing protrusion may seal an inlet of the penetration hole.

A cooling apparatus of a drive motor that is disposed in a motor housing of the drive motor according to another exemplary embodiment of the present invention may include a flow passage through which coolant flows. The flow passage is formed in the motor housing. A coolant inflow portion and a coolant outflow portion are connected with the flow passage. At least one penetration hole is formed in the motor housing and connected with the flow passage. A seal bolt is engaged with the penetration hole and sealing the penetration hole. A part of the seal bolt protrudes to the flow passage and reduces a cross-sectional area of the flow passage.

At least one cooling fin may protrude from a portion where the part of the bolt portion protrudes to the cooling passage.

A method according to another exemplary embodiment of the present invention may include manufacturing a motor housing by core-type low pressure casting so that a flow passage is formed in motor housing as one unit. The motor housing also includes a coolant inflow portion and a coolant outflow portion that are connected with the flow passage and a penetration hole that is formed in the motor housing and connected with the flow passage. A seal member is engaged with the penetration hole so that a portion of the seal member extends into the flow passage so as to vary a cross-sectional area of the flow passage.

The penetration hole can be formed as a core hole.

The seal member can comprise a seal bolt.

According to an exemplary embodiment of the present invention, since a bolt portion of a seal bolt partially protrudes to a flow passage through a penetration hole and a cross-sectional area of the flow passage is reduced by the bolt portion, a velocity of coolant flowing in the flow passage is increased and cooling performance is improved.

BRIEF DESCRIPTION OF THE DRAWINGS

The accompanying drawings are referenced merely to describe exemplary embodiments of the present invention, and therefore a technical spirit of the present invention is not to be construed to be limited to the accompanying drawings.

DETAILED DESCRIPTION OF ILLUSTRATIVE EMBODIMENTS

Figure 1:
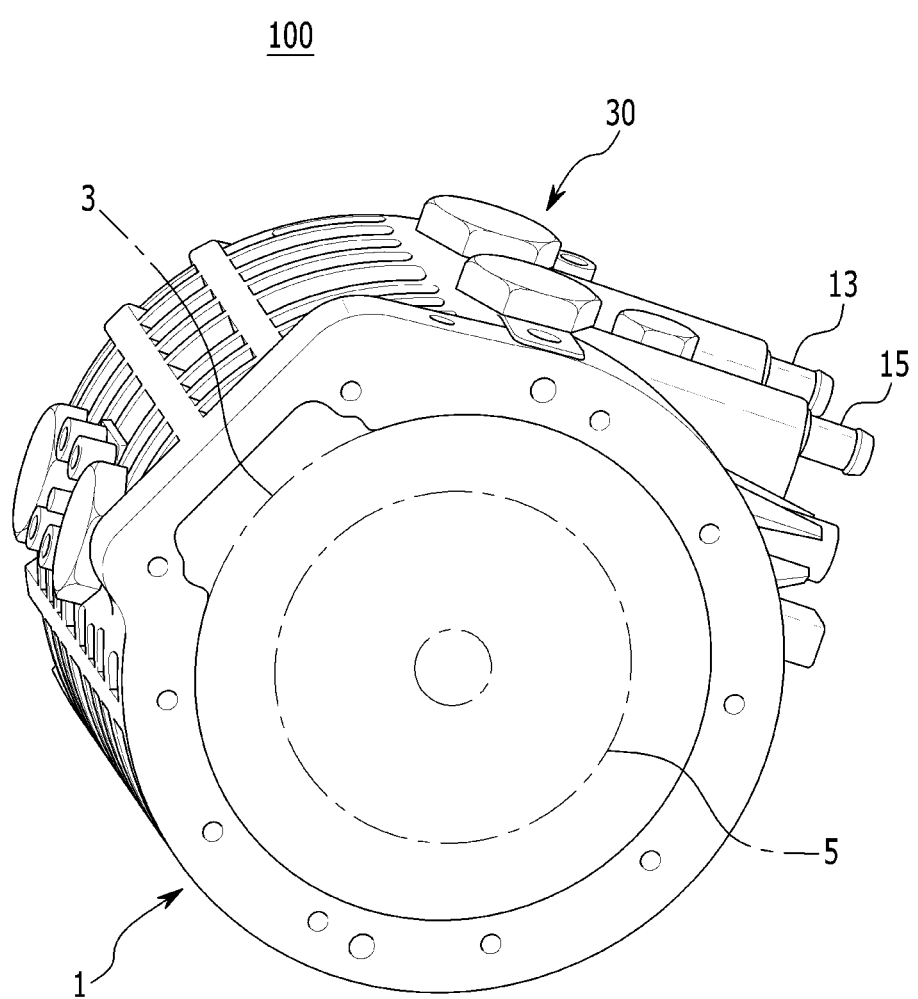
FIG. 1 is a perspective view illustrating a cooling apparatus of a drive motor according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the magnitude and thickness of each configuration shown in the drawings are arbitrarily shown for better understanding and ease of description, but the present invention is not limited thereto. In the drawings, the thickness of layers, films, panels, regions, etc., are exaggerated for clarity.

Discriminating the names of components as first, second, etc. in the following description is for discriminating them in the same relationship of the components, and the components are not limited to the order in the following description.

Throughout the specification, unless explicitly described to the contrary, the word "comprise" and variations such as "comprises" or "comprising" will be understood to imply the inclusion of stated elements but not the exclusion of any other elements.

Further, the terms " . . . unit", " . . . part", " . . . portion", " . . . member", etc. used herein mean units of inclusive components performing one or more functions or operations.

FIG. 1 is a perspective view illustrating a cooling apparatus of a drive motor according to an exemplary embodiment of the present invention.

Referring to FIG. 1, a drive motor according to an exemplary embodiment of the present invention may be applied to an electric vehicle or a hybrid vehicle. For example, the drive motor may be fixedly mounted to an automatic transmission of a hybrid vehicle.

The drive motor according to an exemplary embodiment of the present invention may include a permanent magnet synchronous motor (PMSM) or a wound rotor synchronous motor (WRSM).

The drive motor is fixedly mounted inside a motor housing 1. The drive motor includes a stator 3 for generating a magnetic flux and a rotor 5 arranged with a predetermined air gap to the stator 3 for rotating centered on a rotating shaft as a drive shaft. The inside of the motor housing 1 means an inside space of the motor housing 1.

For example, the drive motor may be applied to an interior rotor type of synchronous motor in which the rotor 5 is disposed inside the stator 3. The stator 3 may be of a concentrated winding split core type which has a plurality of split cores each with a stator coil (not shown) wound thereon.

A cooling apparatus 100 applied to the drive motor has a structure in which heat transmitted from the drive motor to the motor housing 1 is dissipated through a cooling medium (for example, cooling water).

Further, according to an exemplary embodiment of the present invention, the cooling apparatus 100 of the drive motor can reduce cross-sectional area of coolant flowing in the motor housing 1 by simple configuration and maximize a velocity of coolant such that cooling performance of the drive motor can be improved.

Figure 2:
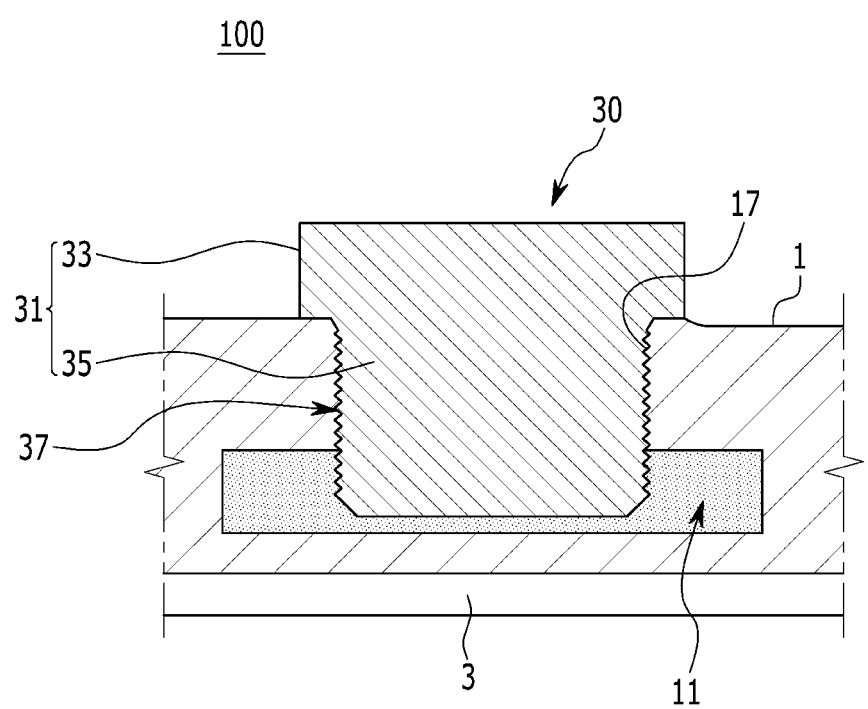
FIG. 2 is a partial cross-sectional schematic diagram illustrating a cooling apparatus of a drive motor according to an exemplary embodiment of the present invention.

FIG. 2 is a partial cross-sectional schematic diagram illustrating a cooling apparatus of a drive motor according to an exemplary embodiment of the present invention.

Referring to FIG. 1 and FIG. 2, according to an exemplary embodiment of the present invention, a flow passage 11 through which coolant flows is formed inside the motor housing 1. The flow passage 11 is a cooling channel through which coolant flows and is formed in the motor housing 1 along a circumferential direction of the motor housing 1. The inside of the motor housing 1 is not an internal space of the motor housing 1 but is a space formed in the motor housing 1 itself.

A coolant inflow portion 13 and a coolant outflow portion 15 connected with the flow passage 11 are formed at an exterior surface of the motor housing 1, and a plurality of penetration holes 17 connected with the flow passage 11 are formed in an exterior surface of the motor housing 1.

The motor housing 1 is manufactured as a core-type low pressure casting to have the flow passage 11 formed therein as one unit with the securing member. The penetration hole 17 is formed as a core hole for forming the flow passage 11 in the motor housing 1.

Further, the cooling apparatus 100 of the drive motor according to an exemplary embodiment of the present invention is engaged with the penetration hole 17 in order to improve cooling performance of the drive motor. The cooling apparatus 100 seals the penetration hole 17, and includes a seal member 30 for varying a cross-sectional area of the flow passage 11.

Figure 3:
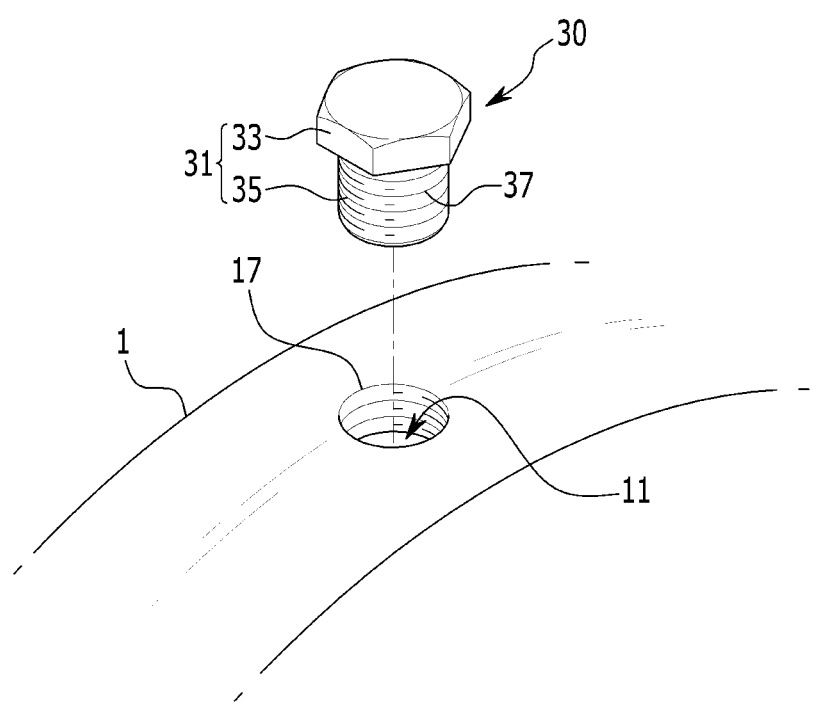
FIG. 3 is a perspective view illustrating a seal bolt applied to a cooling apparatus of a drive motor according to an exemplary embodiment of the present invention.

The seal member 30 according to an exemplary embodiment of the present invention includes a seal bolt 31 engaged with the penetration hole. FIG. 3 is a perspective view illustrating a seal bolt applied to a cooling apparatus of a drive motor according to an exemplary embodiment of the present invention.

Referring to FIG. 2 and FIG. 3, the seal bolt 31 according to an exemplary embodiment of the present invention includes a head portion 33 and a bolt portion 35. The head portion 33 supports an edge portion of the penetration hole 17 in an outer surface of the motor housing 1.

The bolt portion 35 seals the penetration hole 17, is integrally connected with the head portion 33, and is engaged with an interior circumference of the penetration hole 17 by screw coupling. A screw thread 37 is formed in an external circumference of the bolt portion 35 corresponding to a screw thread formed in an internal circumference of the penetration hole 17.

The bolt portion 35 partially protrudes into the flow passage 11 through the penetration hole 17, and reduces the cross-sectional area of the flow passage 11. The bolt portion 35 can vary the cross-sectional area of the flow passage 11 according to a depth of engagement or a length of engagement with respect to the penetration hole 17.

Here, in order to prevent loss of coolant pressure, it is preferable that a maximally protruded cross-sectional area of the bolt portion 35 with respect to the flow passage is 50% of the cross-sectional area of the flow passage.

According to an exemplary embodiment of the present invention, when the drive motor is operated, coolant flows into the flow passage 11 through the coolant inflow portion 13 of the motor housing 1, and is exhausted to the coolant outflow portion 15 after passing through the flow passage 11. At this time, the seal bolt 31 is engaged with the penetration hole 17 of the external circumference of the motor housing 1, and the penetration hole 17 is sealed by the seal bolt 31.

Heat generated from the drive motor is transmitted to the motor housing 1 through the stator 3 and is dissipated by coolant flowing in the flow passage 11 of the motor housing 1, and thus the drive motor is cooled.

During the above procedure, since the bolt portion 35 of the seal bolt 31 partially protrudes into the flow passage 11 through the penetration hole 17 and the cross-sectional area of the flow passage 11 is reduced by the bolt portion 35, velocity of coolant flowing through the flow passage 11 is maximized and cooling performance of the drive motor is improved.

Figure 4:
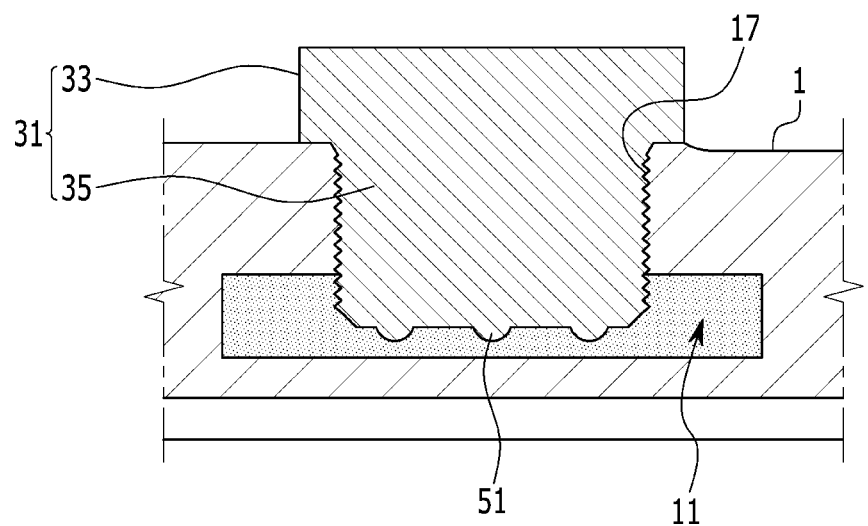
FIG. 4 is a drawing illustrating a first modification of a seal bolt applied to a cooling apparatus of a drive motor according to an exemplary embodiment of the present invention.

FIG. 4 is a drawing illustrating a first modification of a seal bolt applied to a cooling apparatus of a drive motor according to an exemplary embodiment of the present invention.

Referring to FIG. 4, according to the first modification of an exemplary embodiment of the present invention, the seal bolt 31 includes the head portion 33, the bolt portion 35, and at least one cooling fin 51 formed in the bolt portion 35. The cooling fin 51 protrudes from a protruded portion where a part of the bolt portion protrudes to the cooling passage.

For example, the cooling fin 51 protrudes from the protruded portion with a hemispheric shape. The cooling fin 51 may be disposed at a center of coolant flowing in the flow passage 11 either singularly or in plural, or the cooling fin 51 may be disposed at a position away from the center of coolant flowing in the flow passage 11 either singularly or in plural. Further, the cooling fins 51 may be disposed at the center of coolant and the position away from the center of coolant as shown in the drawing.

Accordingly, heat of the drive motor is easily dissipated by the cooling fin 51 of the bolt portion 35 such that cooling performance of the drive motor is improved.

Figure 5:
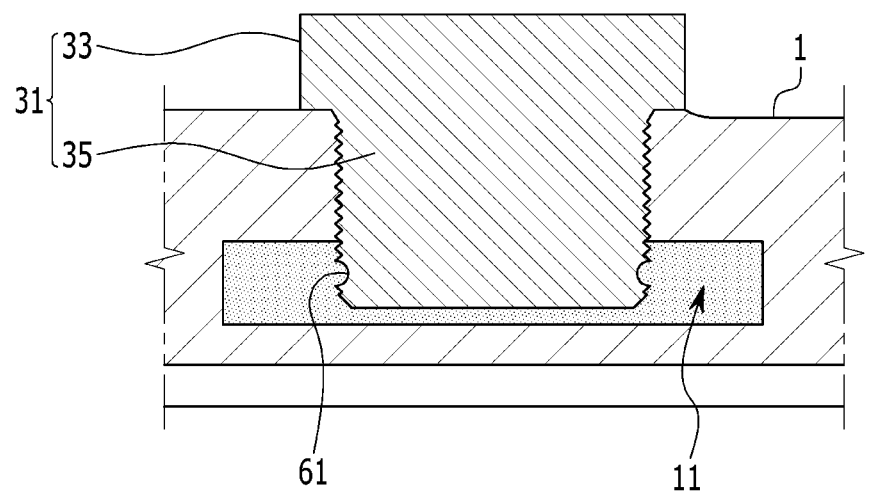
FIG. 5 is a drawing illustrating a second modification of a seal bolt applied to a cooling apparatus of a drive motor according to an exemplary embodiment of the present invention.

FIG. 5 is a drawing illustrating a second modification of a seal bolt applied to a cooling apparatus of a drive motor according to an exemplary embodiment of the present invention.

Referring to FIG. 5, according to the second modification of an exemplary embodiment of the present invention, the seal bolt 31 includes the head portion 33, the bolt portion 35, and at least one cooling groove 61 formed in an external circumference of a protruded end portion of the bolt portion 35 along a circumferential direction. For example, the cooling groove 61 has a semicircular shape, and is formed in an external circumference of a protruded portion of the bolt portion 35 along an external circumference direction.

Accordingly, since a contact area of coolant which flows along the flow passage 11 of the motor housing 1 is increased by the cooling groove 61 of the bolt portion 35, heat generated from the drive motor is easily dissipated and cooling performance of the drive motor is improved.

Figure 6:
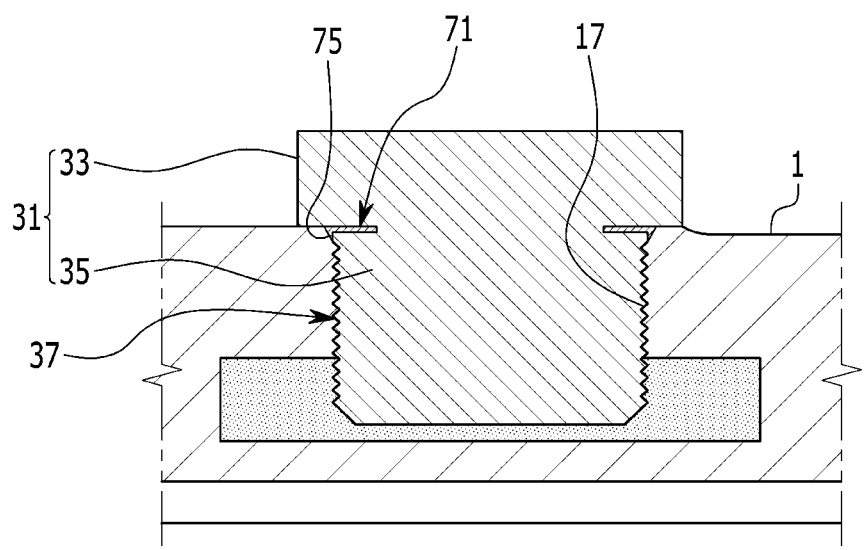
FIG. 6 and FIG. 7 are drawings a third modification of a seal bolt applied to a cooling apparatus of a drive motor according to an exemplary embodiment of the present invention.
Figure 7:
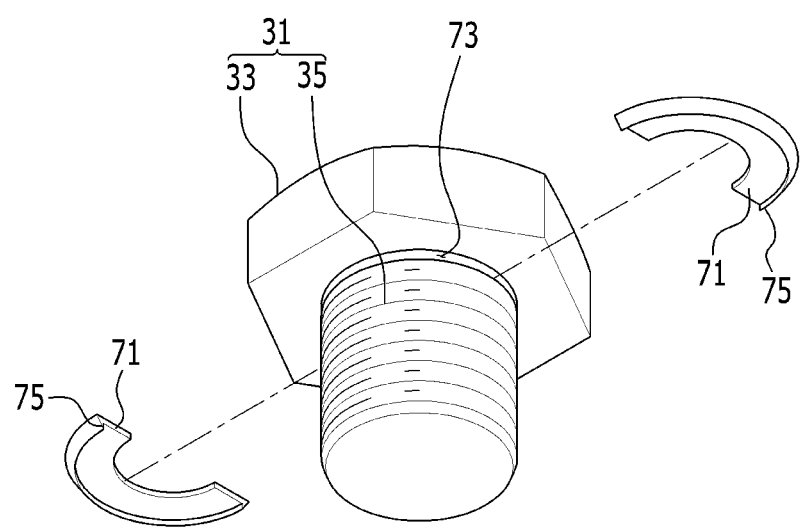

FIG. 6 and FIG. 7 are drawings of a third modification of a seal bolt applied to a cooling apparatus of a drive motor according to an exemplary embodiment of the present invention.

Referring to FIG. 6 and FIG. 7, according to the third modification of an exemplary embodiment of the present invention, the seal bolt 31 includes a sealing gasket 71 for preventing leakage of coolant.

The sealing gasket 71 is engaged with a connection portion where the head portion 33 and the bolt portion 35 are connected along a circumferential direction, and seals an inlet of the penetration hole 17.

The sealing gasket 71 has a semicircular shape like a washer, and the sealing gasket 71 is assembled to a gasket groove 73 at both side of the connection portion. The sealing gasket 71 may seal the inlet of the penetration hole 17 between the head portion 33 and the bolt portion 35 when the seal bolt 31 is engaged with the penetration hole 17.

Further, a sealing protrusion 75 is formed at an exterior end portion of the sealing gasket 71 in order to efficiently seal the inlet of the penetration hole 17. The sealing protrusion 75 may be formed with a hook shape. The sealing protrusion 75 seals the inlet of the penetration hole 17 between the head portion 33 and the bolt portion 35.

Accordingly, sealing performance of the seal bolt 31 is improved by the sealing gasket 71, and it is possible to prevent coolant from leaking through the penetration hole 17.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cooling apparatus that is configured to be disposed in a motor housing of a driving motor, the cooling apparatus comprising:
   a flow passage through which coolant can flow, wherein the flow passage is formed in the motor housing;
   a coolant inflow portion and a coolant outflow portion that are connected with the flow passage;

a penetration hole that is formed in the motor housing and connected with the flow passage; and a seal member that is engaged with the penetration hole and configured to vary a cross-sectional area of the flow passage.

2. The cooling apparatus of claim 1, wherein the motor housing is manufactured by core-type low pressure casting to have the flow passage formed therein as one unit.

3. The cooling apparatus of claim 2, wherein the penetration hole is formed as a core hole.

4. The cooling apparatus of claim 1, wherein the seal member includes a seal bolt configured to vary the cross-sectional area of the flow passage.

5. The cooling apparatus of claim 4, wherein the seal bolt comprises:

a head portion supporting an edge portion of the penetration hole; and a bolt portion integrally connected with the head portion and engaged with an interior circumference of the penetration hole.

6. The cooling apparatus of claim 5, wherein a part of the bolt portion protrudes to the flow passage through the penetration hole and reduces the cross-sectional area of the flow passage.

7. The cooling apparatus of claim 6, wherein a maximally protruded cross-sectional area of the bolt portion with respect to the flow passage is 50% of the cross-sectional area of the flow passage.

8. The cooling apparatus of claim 6, wherein the bolt portion comprises a cooling fin that protrudes from a protruded portion where the part of the bolt portion protrudes to the flow passage.

9. The cooling apparatus of claim 6, wherein the bolt portion comprises a cooling groove formed at an end portion of the bolt portion along an outside circumferential surface thereof.

10. The cooling apparatus of claim 5, wherein a gasket groove is formed at a connection portion where the head portion and the bolt portion are connected, the cooling apparatus further comprising sealing gaskets having a semicircular shape that are assembled to the gasket groove at both sides of the connection portion.

11. The cooling apparatus of claim 10, wherein a hook-shaped sealing protrusion is formed at an exterior end portion of the sealing gasket, and the sealing protrusion seals an inlet of the penetration hole.

12. A cooling apparatus of a drive motor that is disposed in a motor housing of the drive motor, the cooling apparatus comprising:

a flow passage through which coolant can flow, wherein the flow passage is formed in the motor housing;

a coolant inflow portion and a coolant outflow portion that are connected with the flow passage;

a penetration hole formed in the motor housing and connected with the flow passage; and a seal bolt engaged with the penetration hole and sealing the penetration hole, wherein a part of the seal bolt protrudes to the flow passage to reduce a cross-sectional area of the flow passage.

13. The cooling apparatus of claim 12, wherein the seal bolt includes a cooling fin that protrudes from a portion of the seal both where the part of the seal bolt protrudes to the flow passage.

14. The cooling apparatus of claim 12, wherein the seal bolt comprises a head portion supporting an edge portion of the penetration hole, and a bolt portion integrally connected with the head portion and engaged with an interior circumference of the penetration hole.

15. A method comprising:

manufacturing a motor housing by core-type low pressure casting so that a flow passage is formed in motor housing as one unit, the motor housing also including a coolant inflow portion and a coolant outflow portion that are connected with the flow passage and a penetration hole that is formed in the motor housing and connected with the flow passage; and engaging a seal member with the penetration hole so that a portion of the seal member extends into the flow passage so as to vary a cross-sectional area of the flow passage.

16. The method of claim 15, wherein the penetration hole is formed as a core hole.

17. The method of claim 15, wherein the seal member comprises a seal bolt.

* * * * *